United States Patent [19]
Von Kohorn

[11] Patent Number: 4,626,968
[45] Date of Patent: Dec. 2, 1986

[54] DEVICE FOR ILLUMINATING CENTRIPETALLY VIEWED THREE-DIMENSIONAL OBJECTS IN WET LOCATIONS

[76] Inventor: Henry Von Kohorn, 22 Perkins Rd., Greenwich, Conn. 06830

[21] Appl. No.: 697,168

[22] Filed: Feb. 1, 1985

Related U.S. Application Data

[63] Continuation-in-part of Ser. No. 660,905, Oct. 15, 1984, Pat. No. 4,594,646.

[51] Int. Cl.[4] .............................................. F21P 1/02
[52] U.S. Cl. .................................... 362/122; 362/805
[58] Field of Search ............... 362/805, 806, 122, 33, 362/154, 311

[56] References Cited

U.S. PATENT DOCUMENTS

| | | | |
|---|---|---|---|
| 1,758,130 | 5/1930 | Shoemaker | 362/806 |
| 2,631,409 | 3/1953 | Windiate | 362/122 |
| 2,709,217 | 5/1955 | McCluskey | 362/122 |
| 2,723,341 | 11/1955 | Greenspan | 362/122 |
| 3,162,367 | 12/1964 | Nowack | 362/806 |
| 4,349,864 | 9/1982 | Smith | 362/122 |
| 4,390,928 | 6/1983 | Runge | 362/806 |

FOREIGN PATENT DOCUMENTS 33408 10/1964 German Democratic Rep. .................................... 362/122

*Primary Examiner*—Ira S. Lazarus
*Attorney, Agent, or Firm*—Parmelee, Bollinger & Bramblett

[57] ABSTRACT

Disclosed are devices and systems for the indirect, substantially glare-free, directional lighting of three-dimensional objects, such as plants and outdoor sculptures. Artificial light is generated at a central point which is recessed, in close proximity to, and below the objects which may be exposed to rain or other sources of water. The light is directed upwardly through transparent areas in a water-tight housing in the shape of a predetermined light mantle substantially enveloping the object without significant scattering of the light, which is indirectly visible by its reflections from the illuminated object. When illuminating objects such as a flower arrangement, a disclosed device permits lighting the inside of such flower arrangement, as well as its outer reaches. The devices permit substantially glare-free viewing by a plurality of observers grouped around the illuminated object in a circle.

5 Claims, 5 Drawing Figures

DEVICE FOR ILLUMINATING CENTRIPETALLY VIEWED THREE-DIMENSIONAL OBJECTS IN WET LOCATIONS

This application for letter patent is a continuation-in-part of application Ser. No. 06/660,905 filed Oct. 15, 1984, now U.S. Pat. No. 4,594,646.

BACKGROUND OF THE INVENTION

The present invention relates to the directional lighting of objects having three-dimensional surfaces, such as plants, sculptures and other defined objects.

It particularly relates to the glare-free illumination of objects intended to be centripetally viewed by a plurality of observers grouped around such lighted object and where such objects may be exposed to moisture, such as plants requiring watering or objects exposed to rain.

Conventional methods used to light three-dimensional objects involve the use of spotlights, ceiling lights, track lights and the like, normally beamed at and around the object to be illuminated from a distance, normally of several meters. Such lighting methods and devices have a number of disadvantages. A primary disadvantage stems from the distance at which conventional lights are mounted from the object to be illuminated. This causes not only loss of lumens, but a scattering of light beyond the confines of the object. It is obvious that, the greater the distance, the more difficult it is to economically direct light with precision at three-dimensional objects, especially objects having irregular configurations. An illustration would be a tall or spindly plant or an irregularly shaped object, in the lighting of which much of the light passes by and through such an object.

A serious drawback of such lighting methods lies in the glare produced by ceiling lights and spotlights, which results in discomfort to the eyes of observers.

Glare-free lighting devices positioned in close proximity to the objects to be illuminated are known and employed in the conventional lighting of two-dimensional surfaces such as paintings, murals, wall hangings and the like. Such devices, mounted for instance at the top or bottom edge of a painting, are however, not suitable for lighting objects having three-dimensional surfaces, such as standing or hanging indoor plants, or outdoor plants, in a decorative, pleasing and effective manner. The present invention is specifically directed towards the illumination of objects having three-dimensional surfaces and does not relate to the lighting of two-dimensional, planar, or essentially flat areas, such as floors and walls, or other flat objects such as paintings and tapestries.

Lighting devices, such as spotlights, for lighting indoor and outdoor plants are used extensively in the illumination of specific three-dimensional objects. The light from such light sources, illuminating for instance the foliage of plants, normally emanates from one source or from several discrete light sources placed at a distance from the object. The disadvantages of these devices are several. First, the light originating at a single source or even at several sources, positioned at a distance and directed at a plant, illuminates only that facet of the foliage which faces such light sources, i.e. one side of the plant. Also, such light usually shines across and through the plant, which is inefficient; more importantly, the naked light shines directly into the eyes of persons facing the light source. If the illuminated plant is thick or dense enough to prevent light from shining through it in such annoying fashion, it follows that the side of the plant facing away from the light source receives no illumination at all. If, in order to overcome these drawbacks, several light sources are disposed around the object to be illuminated, the equipment cost and operating expenses are correspondingly multiplied. Furthermore, the lighting effect of such devices is not uniform and juxtapositioned persons will be exposed to glare.

The present invention therefore is intended to be useful in lighting three-dimensional objects involving multi-directional and centripetal (radially inward) viewing by juxtapositioned observers on opposite sides of the object to be illuminated, irrespective of whether the lighted object is transparent, has openings, or is irregularly shaped. Using currently available devices, the pleasing effect of lighting the foilage of plants and shrubs is destroyed when the human eye is directly exposed to the light source.

The type of outdoor lighting device commonly used, which has reflectors directing light downwardly in a glare-free manner towards the ground is capable of illuminating only flowers or short plants; whereas the advantages of the present invention do not depend on the height, shape or level of the object to be illuminated.

As previously stated, whenever spotlights or similar lights are used in illuminating plants, juxtapositioned observers, i.e. observers positioned on the side of the plant opposite to that where such light source is mounted, are exposed to the unpleasant glare of directly viewed light. For these reasons, known lighting devices are unsatisfactory when objects are displayed for viewing from all sides, e.g. freestanding museum exhibits. The present invention addresses problems of this nature, as for instance lighting a sculpture in such fashion that observers grouped in a circle around the exhibit will each have an unobstructed, glare-free view of the uniformly lighted sculpture, or even of a sculpture having individual features requiring different individual lighting.

Indoor plants requiring watering frequently are overwatered; outdoor plants, sculptures and the like are exposed to rain and in these instances the water will run down over the surfaces of the lighting device positioned below the object to be illuminated, necessitating waterproof lighting fixtures in order to prevent short circuits. The present invention is intended to provide a simple, effective and economical lighting device suitable for wet locations.

It therefore is a principal object of the invention to directionally illuminate three-dimensional objects, such as plants and sculptures positioned above, at, or below the eye level of observers in such a manner that the source of light is not directly visible and glare is avoided.

It is another object to minimize the loss and consumption of lumens by placing the light source in close proximity to the object to be illuminated so as to shorten to the absolute practical minimum the path the light has to travel to reach the object.

It is still another object of the invention to avoid the scattering of light inherent in other indirect lighting methods.

It is yet another object to provide an illuminating system and luminaire which are economical and simple to manufacture, install and maintain, and which are highly efficient in operation.

It is another principal object to provide an illuminating device having the above mentioned features and being suitable for use in wet locations.

It is another aspect to provide an illuminating device simultaneously serving as a plant container.

It is yet another object to provide a device capable of lighting an object, such as a flower arrangement, from the inside, as well as lighting its outer reaches in a decorative, pleasing manner.

Definitions

The avoidance of glare is a principal object of the invention. The Encyclopaedia Britannica published in 1956 defines glare as follows:

"When brightness becomes irritating it is recognized as "glare." Glare contributes more to the poor quality of a lighting system than any other factor. Glare may depend upon several conditions present in the lighting system: (1) high brightness of the source; (2) high brightness contrast between the source and the background; (3) location of the source in the field of view; (4) the total volume of the light entering the eye; and (5) the time of exposure to the brightness source. The correction of any one of these contributing factors becomes simple when it is considered individually. Because of the injurious effect of glare, either direct as from a source, or reflected from some object which reflects a specular image, bare lamps exposed in any plane should never be used. It is of prime importance that all forms of glare be controlled properly."

The term "source of light" as used herein is intended to include where appropriate a combination of more than one lamp positioned at a lighting hub below the object or objects to be illuminated. Such "light source" may consist of a cluster or a string of lamps or long fluorescent lamps used in accordance with the present invention. The term "light mantle" as used herein denotes a wall, beam or band of light of predetermined width and configuration. The term "object" or "object to be illuminated" is intended to include, where appropriate, the holder or support for sculptures, or associated elements of such objects, as for instance a planter or the flower pot of a plant. The term "reflective" as used hereinafter is defined as "light-reflective". The term "bowl-shaped" or "dished" is intended to refer to all concave structures, such as vessels or reflectors having an approximately parabolic, elipsoid or hemispheric configuration at their bottom, irrespective of the configuration of the rest of the wall surface between the bottom and the rim of the vessel. The terms "water-tight" or "water-proof" as used herein are defined as the condition of not permitting water to penetrate or pass between members of the device claimed; whether as a result of selection of materials or the bonding of members, or as a result of the loose combination or engagement of appropriately configured members, making use solely of the principle of gravity as applying to water.

The various objects and advantages of the invention will become apparent from the following description and accompanying drawings. While the description and drawings are for illustrative purposes primarily directed to plants, it should be obvious that the devices and systems claimed are equally suitable for and applicable in the illumination of other objects, such as sculptures, statues, mineral exhibits, theatrical devices, stage props and show pieces of any nature, whether or not exposed to water.

SUMMARY OF THE INVENTION

The invention may be summarized as being directed to devices and systems for the substantially glare-free, directional lighting of three-dimensional objects which may be exposed to water, comprising the following features.

1. The devices are adapted to have the object to be illuminated positioned above and close to the light source, reducing the path the light has to travel to a minimum.

2. The device extends horizontally to the space below the outer reaches of the object.

3. The device comprises an inverted housing, open at the bottom, having water-tight upper and side walls.

4. The light source is recessed in said housing above the lower edge of the side walls, so that water falling, or otherwise contacting the housing, runs off and does not contact the light source.

5. The housing, in its upper part, has transparent, essentially horizontal, peripheral portions encircling the object, permitting light generated below said object to pass therethrough vertically or at an angle in the direction of the outer reaches of the object.

6. Portions of the inside surfaces of said housing may be light-reflective.

7. When desired, light is permitted to escape upwardly through transparent members supporting the object, and through the object, such as a flower arrangement, so as to illuminate the same from the inside.

8. When desired, said transparent areas encircling the object through wich light can escape, may be recessed between surrounding, light-shielding walls, thus protecting the eyes of observers grouped around the object from direct view of the light source and resulting glare.

9. The predetermined beaming of light through said transparent portions in the direction of the object avoids wasteful scattering of light.

10. The light mantle emanating from the peripheral transparent portions and the light beam emanating from the transparent member supporting the object in combination illuminate the object from the inside and outside, producing more even, penetrating and pleasing lighting effects.

Additional features of the present invention are described in the detailed description that follows.

The lighting method and devices of the present invention drastically reduce electric power requirements by reducing the distance between the light source and the objects to be illuminated to the practical minimum. Except for internal distances in the housing containing the light source, including the support means for the object to be illuminated, such as a shelf, the light source is proximate to said object. This arrangement reduces the light path in virtually all instances to substantially less than one meter. In most cases, the light will travel no more than 10-20 centimeters to reach the object.

The devices described are suitable for the lighting of such indoor and outdoor objects as natural and artificial plants, sculptures and other free-standing objects exposed to moisture, but obviously, the device also protects the light source from dust and other foreign matter and is suitable for use in dry locations.

DETAILED DESCRIPTION OF THE INVENTION AND DRAWINGS

Figure 1:
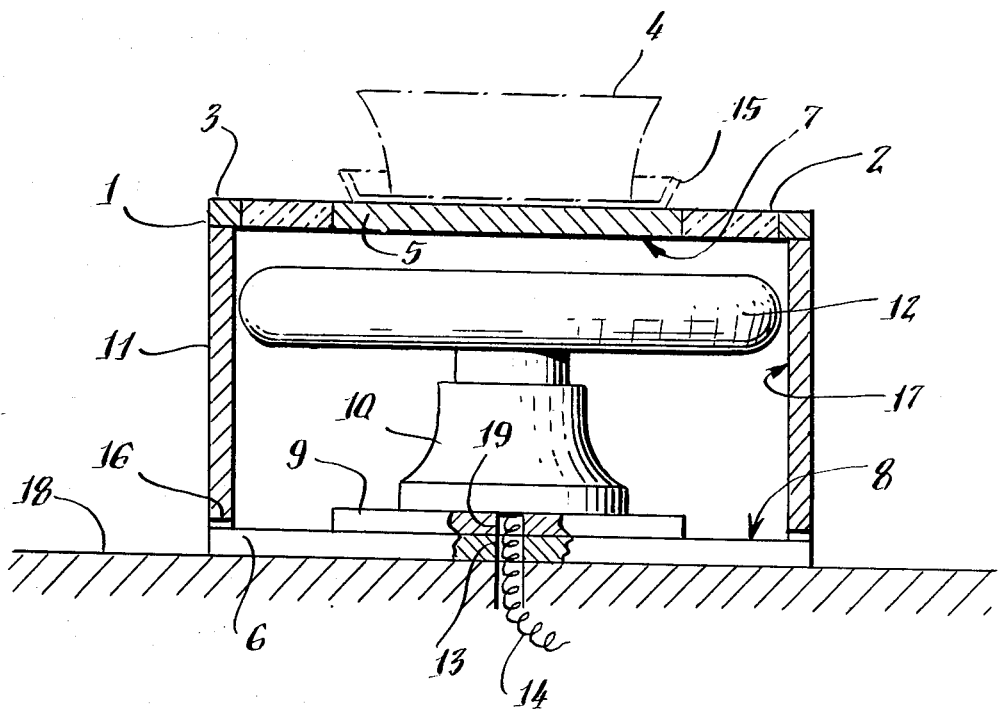
FIG. 1 is a diagrammatic cross-sectional view of the illuminating device with one housing.

FIG. 1 is a diagrammatic cross-sectional side view of the illuminating device having a light source surrounded by a single cylindrical housing resting on support means. Upper wall 1 comprises central portion 5, peripheral portions 3 and transparent portions 2. Upper wall 1 is water impermeable. Portion 3 need not be, but may be, transparent. Upper wall 1 is adapted to support directly above it a container 4 which may be a flower pot provided with saucer 15 below it and both indicated in dotted lines. Joined to upper wall 1 is water impermeable side wall 11. Upper wall 1 is joined to side wall 11 in a water-tight mode, such as by gluing or cementing. Walls 1 and 11 therefore constitute one water impermeable and water-tight housing. The lower portions 16 of side wall 11 may have perforations and openings, or they may have attached to them at their lower edges appropriate legs to support said housing.

The legs or lower portions 16 of side walls 11 rest on support 6. A raised horizontal member 9 rests on support 6 and said member 9 in turn supports lamp base 10. Fluorescent lamp 12 is of the type incorporating ballast and starter, which may be screwed into lamp base 10.

One or more of the inside surfaces 7,8 and 17 may be reflective. Light generated by lamp 12 escapes upwardly towards the upper reaches of the plant or flowers contained in flower pot 4. At the same time rain water or water caused by over-watering the plant in container 4 will fall on the water impermeable housing formed by the water tight joining of upper wall 1 and side wall 11. The water will run down the outside surfaces of said housing to a level where wall 11 or the unperforated portions of side wall 11 terminate. Due to the raised position of lamp 12 in base 10 resting on member 9, any water entering the said housing does so below the level of exposed electrical components of the light source. Water-proof cable 14, such as rubber-insulated or other clad cable, conduct electric power through opening 13 in support 6 and opening 19 in raised member 9 to the electrical connections in lamp base 10. Support 6 for the housing rests on surface 18 and any water running off said housing will ultimately find its way on to surface 18 or into such drainage means as may be provided.

Figure 2:
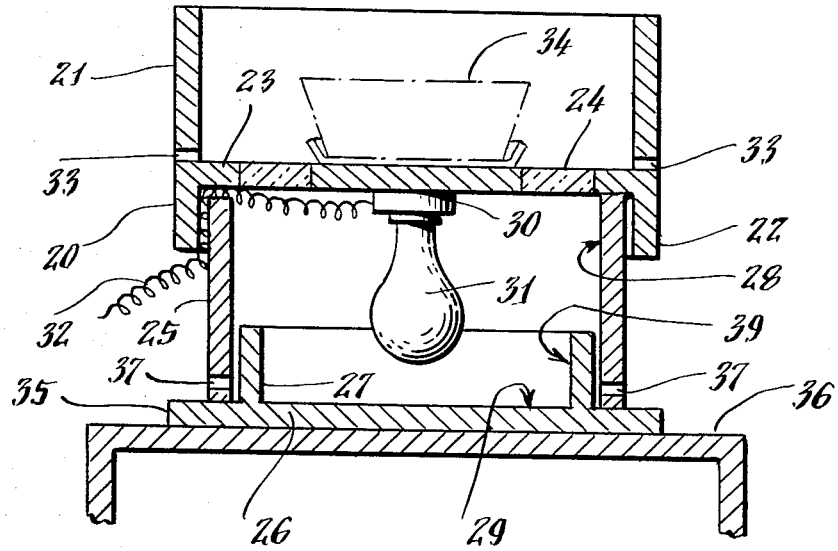
FIG. 2 is a diagrammatic cross-sectional view of the illuminating device having an outer and an inner housing.

FIG. 2 is a diagrammatic, cross-sectional view of the device having a light source mounted on the upper wall of an open-ended, cylindrical, outer housing, the open end facing downward, into which is inserted a second, cylindrical, inner housing having an open end facing upward. Said outer housing 20 comprises an upper wall 23 which has transparent portions 24 forming a ring. Attached to upper wall 23 in a water-tight manner is a peripheral, cylindrical member extending downwards to lower portions 22 and upwards to upper portions 21. At least lower portions 22 are water-impermeable and joined to water-impermeable upper wall 23 in a water-tight manner. Upper wall 23 and outer housing 20 may consist of one piece, such as an extruded acrylic plastic or formed glass. Upper portions 21 of the peripheral wall serve as light-shielding means, preventing a direct view of transparent portions 24. Water is drained from the cavity formed by upper wall 23 and cylindrical portions 21 through perforations 33.

Water falling on upper wall 23 runs down over the outer water-impermeable surfaces of the lower, cylindrical portions 22 and on down along the outer water-impermeable surface of side wall 25. Side wall 25 has perforations 37 in its lower portion and loosely rests on outer portions 35 of support 26. Side wall 25 may, but need not, be adhered to the lower surface of upper wall 23 in a water-tight manner.It may thus be a separate detachable member. Upper wall 23 may support flower pot 34 directly on its upper surface, or the device may be adapted to otherwise position the object to be illuminated proximate to the light source.

Support 26 and inner, vertical guard walls 27 form a second, inner housing having an open end facing upward. Guard walls 27 are joined to support 26 in a water-tight manner and extend upwardly to a level above the lowest perforated portions 37 of side walls 25, thus preventing water running down the outside surfaces of lower, peripheral wall portions 22 and side wall 25 from reaching the area inside guard wall 27.

Lamp base 30 is mounted on the bottom surface of upper wall 23 and in turn holds incandescent lamp 31. Water-proof cable 32 carrying electricity to the light source may may enter said housings through speaces between peripheral wall 20, upper wall 23 and side wall 25 as shown, but may alternatively pass through any of said walls, provided such entry method does not permit water to enter said housings above or at the level of the light source.

One or more of the inside surfaces 28, 29 and 39 of said housings are light-reflective. Light passing through transparent portions 24 of cylindrical housing 20 is projected in the direction of the plant foliage in the form of an annular light mantle.

Support 26 rests on surface 36, which may for instance be a pedestal, and water running down the outside housing surfaces is either drained along surface 36, or through such conventional drain as may be provided.

It will be apparent that housing 20, side wall 25 and support 26 may be joined and engaged in a loose, separable fashion, but that, due to the interlocking relationship of said members, the device formed by them is a water-tight whole.

Figure 3:
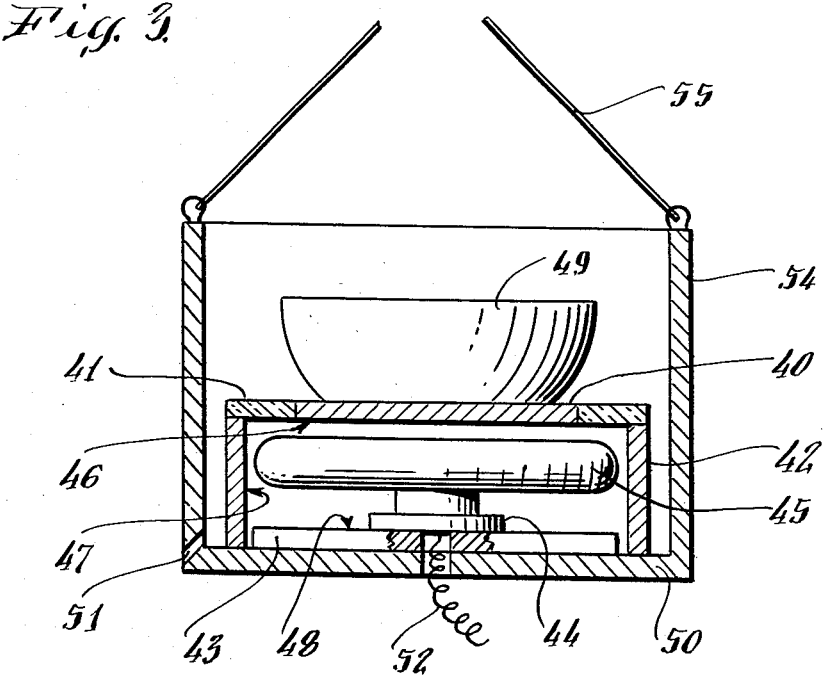
FIG. 3 is a diagrammatic cross-sectional view of an illuminating system comprising an illuminating device having one housing and an outer receptacle therefor.

FIG. 3 shows a diagrammatic cross-sectional side view of a system comprising an illuminating device and an outer receptacle also serving as light shielding means. A cylindrical embodiment is shown, but rectangular or other configurations may be employed. Lamp 45 in base 44 generates artificial light which escapes through transparent portion 41 of upper wall 40. Upper wall 40 is supported by side wall 42 which rests directly on the bottom of outer receptacle 50. Electric power is transmitted to the light source through insulated cable 52 which passes thorough container 50 and support 43 of the light source. One or more of the inside surfaces 46,47 and 48 are light reflective. Upper wall 40 supports flower pot 49 which is positioned directly above and proximate to the illuminating device. The upper wall portions 54 of outer receptacle 50 protrude above the walls of flower pot 49. As a result, the light projected upwardly through said transparent portions 41 which envelops the foliage of the plant in flower pot 49 is shielded from direct view by said upper wall portions 54 of receptacle 50. Thus, persons not directly looking down into said receptacle 50 see the light from the recessed lighting device only by its reflections from the object to be illuminated and are not exposed to glare. Receptacle 50 is supported in a hanging manner by chains 55 or otherwise positioned. Water running down the outer surfaces of the illuminating device is permitted to drain through opening 51 and cannot contact any of the electricity-conducting parts of the light source.

The recessed position of the light source in this and other embodiments of the invention prevents observers, except those looking almost straight down into the device, from seeing the lamp, or even the transparent portions of the upper wall of the device, directly, thus preventing glare and discomfort to the eyes of such obeservers, irrespective of whether their eye level is below, at, or above the level of the object to be illuminated.

Figure 4:
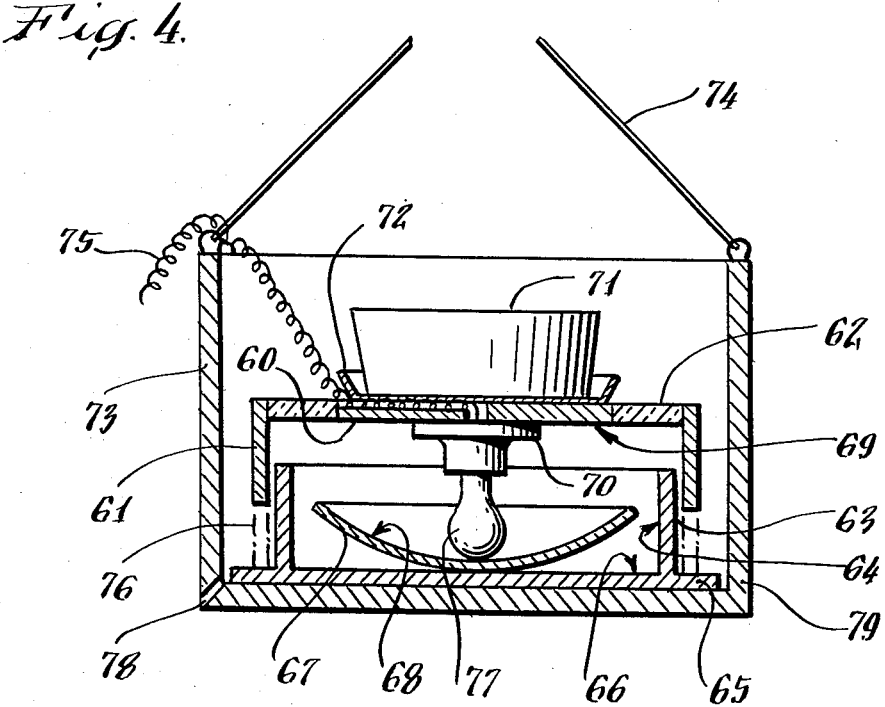
FIG. 4 is a diagrammatic cross-sectional view of an illuminating system comprising an illuminating device consisting of an outer and an inner housing, and outer receptacle therefor.

FIG. 4 is a diagrammatic cross-sectional side elevation of a system incorporating an illuminating device concealed in an outer receptacle. The cylinder-shaped device comprises circular upper wall 60 which has annular transparent portions 62 near its periphery and has a downwardly extending cylindrical skirt 61. Upper wall 60, including transparent portions 62 and skirt 61, is water-impermeable and the said members are joined in a water-tight manner. Skirt 61 of upper wall 60 rests on or is otherwise supported above an inner structure comprising a support 65, to which a side wall 63 extending upwardly is adhered in a water-tight manner. Although in many instances the device has a cylindrical shape, the wall and other elements of the device may be rectangular or of some other configuration. Skirt 61 may have legs or other supports 76 (shown in dotted lines), having perforations or openings between them. The unperforated portion of skirt 61 extends downwardly below the upper rim of side wall 63. Support 65 also supports dished member 67 having reflective inner surface 68. The inner surface 64 of side wall 63, the inner surface 66 of support 65, and the non-transparent portions 69 of the lower surface of upper wall 60 may also be light reflective. Lamp 77, supported by base 70, is attached to upper wall or plate 60 as shown. Flower pot 71 rests on saucer 72 which in turn rests on the upper wall 60 or is otherwise mounted directly above the light source so that the light escaping through transparent portions 62 reaches the object to be illuminated by a very short path.

The illuminating device is positioned in outer receptacle 73 suspended by chains 74. An insulated cable 75 supplies electric power, passing into the housing described without admitting water to the light source. The upper rim of receptacle 73 protrudes above upper wall 60 in such a manner that any observers not peering directly into said receptacle will not be able to see the light source or its light directly but only its reflections from the object to be illuminated. Drains 78 and 79 are provided in receptacle 73.

Because the devices and systems described hereinabove are intended for use in wet locations, all parts exposed to water are rust-proof. The upper wall referred to in connection with the various embodiments of the illuminating device may be made of acrylic plastic or other transparent material, such as glass. Areas which are not intended to be transparent may be opaque, or may be painted, sprayed or otherwise covered. Surfaces intended to be reflective may be naturally reflective, but may also be covered, painted or sprayed with white paint or metallic substances. As indicated in the drawings, fluorescent or incandescent lamps may be used and particularly in the case of incandescent lamps generating substantial amounts of heat, perforations or other openings are provided in the housings described below the level of the elctric current-conducting components of the light source. Water running down over the outside surfaces of the device is drained off without being able to rise to the level of the light source. It is an important feature of the invention that water falling on the illuminating device cascades down over a number of tightly cemented or loosely joined overlapping members in such a manner that such water cannot penetrate or enter the device at a level of the light source, which could produce short circuits. In this manner, relatively simple and cheap light source components may safely be used.

Incandescent, fluorescent or other types of lamps may be used in practicing the present invention. Specifically included are lamps generating light on plant growth promoting wave lengths. Timers and sensors for turning the light source on at dusk and turning it off at dawn may of course be employed.

The lamps may give off colored light, or the transparent portions of the housing may act as color filters. The transparent housing portions may have different colors or color filtering properties, so that the light is transmitted in a variety of predetermined colors to selected surfaces of the object to be illuminated.

Figure 5:
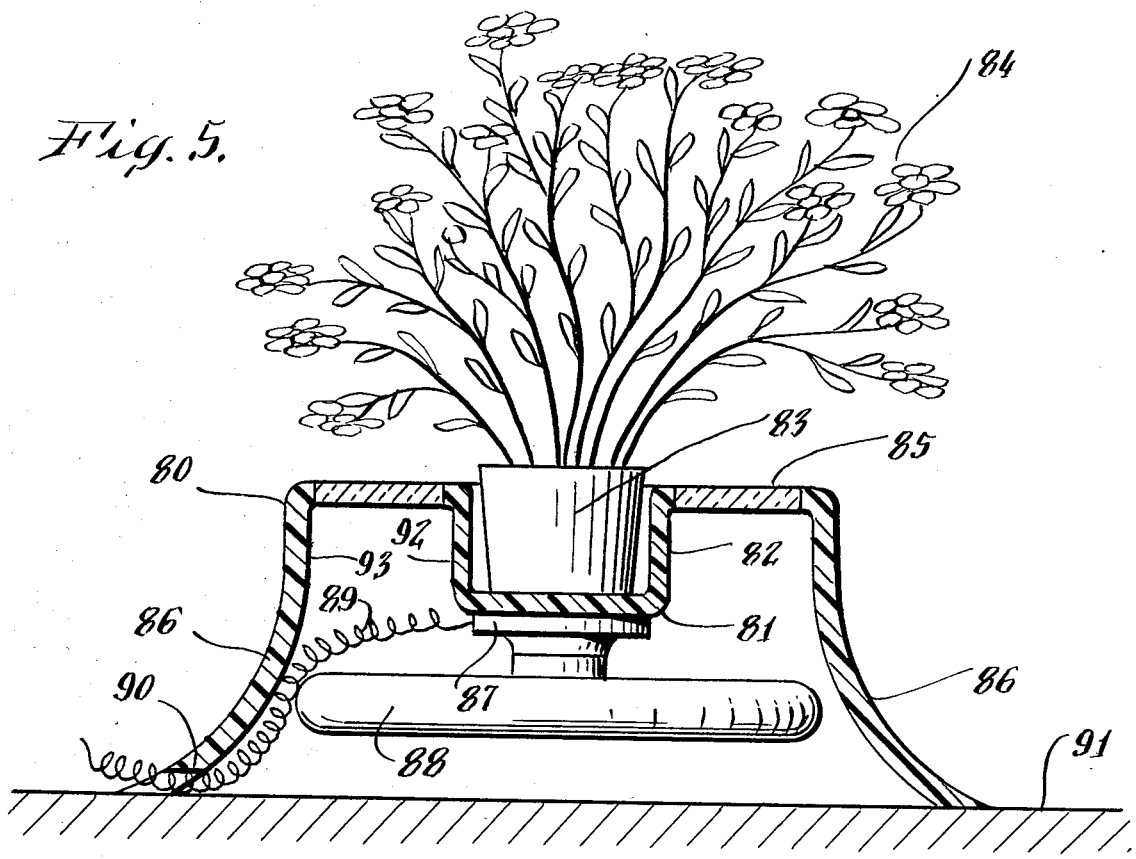
FIG. 5 is a diagrammatic cross-sectional view of an illuminating device comprising a one-piece housing having an upper, outside cavity accommodating the object to be illuminated.

The diagrammatic, cross-sectional view of the device shown in FIG. 5, depicts, as a preferred embodiment, a one-piece, extrusion-molded, acrylic housing 80 having a central cavity comprising bottom wall member 81 and side portions 82. Said cavity partially or completely accomodates the object to be illuminated, in this instance flower pot 83 containing plant 84. Transparent portions 85 surround said cavity on substantially all sides and, together with outer side wall members 86, form housing 80.

Lamp base 87 is adhered to the underside of the wall member 81 and has secured to it fluorescent lamp 88. An insulated, water-proof cable 89 connects the light source to an outside power supply source. Said cable 89 passes through opening 90 in wall member 86 at a level below the level of any of the components which carry electricity. The bottom portions of side wall member 86 may also otherwise be perforated below the level of the light source components that are electrically charged, said perforations permitting air to circulate, or alternatively, the lower extremities of wall members 86 may consist of spaced legs or other types of support. Thus, any water running down the outside of said housing 80 cannot contact the light source and cannot cause short circuits.

Selected inner surfaces of housing 80, such as inner wall portions 92 and 93, may be light-reflective. Light rays generated by the light source travel upwardly through transparent portions 85 in the direction of the outer reaches of the foliage of plant 84. The lower extremities of housing 80 rest on surface 91 from which the water is permitted to drain.

In a modified version of a preferred embodiment of the invention, the outer cavity in the upper part of the housing depicted in FIG. 5 is dimensioned and adapted to serve as a vase, for instance for cut flowers. Said cavity extends downwardly from the upper end of and between the side walls of said housing and is essentially centrally disposed in relation thereto. The walls of said cavity are water-impermeable. It has an upper opening sufficiently wide, and a depth sufficient to accomodate a plant or flowers. The upper peripheral portions 85 of the housing are transparent; although frequently horizontal, they may be slanted so as to deflect the light rays passing upwardly through them into the desired direction. Depending on the configuration of tne flower arrangement, the light may be deflected centripetally (radially inwardly) into a light cone, or centrifugally (radially outwardly) by said transparent sections 85, which consist of glass, acrylic or other transparent material.

In the case of the above example, there is created an empty space between the outer wall 86 of housing 80 of the device depicted in FIG. 5 and wall 82 of said upper cavity. In accordance with the basic characteristics of the present invention, the light source, which may consist of an elongated lamp, or of a group of lamps distributed around said cavity in the space between wall 82 and outer housing wall 86, generates its light below and in close proximity to the object to be illuminated, in this instance the leaves and blossoms of the flowers which the light envelops.

Alternatively, the light source may consist of a single lamp disposed directly underneath said cavity, taking the form, for instance, of an incandescent bulb, circular fluorescent lamp or other type of artificial light source. If the light rays from a single lamp directly underneath said cavity cannot escape directly upwardly through said transparent portions 85, reflective means are provided below said lamp so as to re-direct the light rays upwardly, for instance means similar to dished member 67 of the device depicted in FIG. 4.

When the devices described, as for instance those shown in FIGS. 1-4, have no upper cavity, the object may rest directly on, or may be supported by the upper plate or wall of the housing. When the cavity shown in FIG. 5 is used, the walls of said cavity will be adapted to support the object, Wall member 81, serving as the bottom of the vase, may be a transparent member strong enough to support the flowers and the water in the vase. Thus, light can shine upwardly through said transparent bottom and loosely placed flowers, illuminating the inside of such flower arrangement.

The vertically extending outer housing, which may have vertical walls, is longer and wider than the vertically extending inner flower receptacle or vase portion. In a one-piece structure, said housing and receptacle are connected to each other by the transparent, horizontal section 85. The upper spacing between said vertically extending wall members is determined by the width of the transparent sections 85, which have a central opening corresponding to, or in registry with, the upper opening in the receptacle for the flower arrangement. In a one-piece molded housing, all members consist of the same material, such as an acrylic plastic. Surfaces through which light is not intended to pass, are made translucent or obscure by well known means, or they are made light-reflective by covering them with white paint or other light-reflective substances.

The light source preferably is not attached directly to the underside of the transparent bottom of the vase-like receptacle. It may rest, for instance, on the same support, on which the outer housing of the device rests.

Similarly to the devices described hereinabove, the outer walls are configured so as to prevent water falling on the device or overflowing from said vase from contacting any of the electrical components. Water is, of course, prevented from penetrating between the peripheral transparent portions conjoining the upper ends of the vase and the housing.

The receptacle serving as a vase and the housing may be circular, rectangular or otherwise configured in top plan cross-sectional view. The void created between the vertical walls of the vase and the housing is shaped accordingly. It often is annular, but may take the form of any closed loop or may be discontinuous. The cavity forming the vase is dimensioned so that it accomodates the object, but leaves sufficient space below it for the light source components provided.

When a cavity is employed, the space between it and the outer housing wall may be very narrow, so that, in effect, the entire housing becomes a vase. As an example, but without limitation, the cavity is circular having a depth of 15 cm and an inside diameter of 6 cm; the outer diameter of the cylindrical housing is 10 cm; and the annular void between said cavity and housing wall, after allowing for the two wall thicknesses totalling 1 cm, has a width of 1.5 cm for the passage of light.

In those instances where there are spaced legs or openings provided near the bottom of said housings below the level of the light source, light may escape therethrough and escape upwardly between the outer surfaces of such housing and the inner surfaces of an outer container thus adding to the illuminating effect. In many instances, the light generated by the lamp will be reflected several times in different directions inside the housings, before escaping through the transparent portions of the devices described.

In the case of hanging plants which are draped over the rim of the receptacles, or in the case of sculptures having portions to be highlighted, the said transparent areas in the housing may be shaped or otherwise adapted so as to concentrate the reflected light on the portion of the plant or sculpture to be especially illuminated.

The devices described herein may be used as night lights or to provide subdued illumination when this is desirable in homes and in public places.

Normally, observers are not positioned so close to a plant as to look straight down into a flower pot or other container of the object to be illuminated. The present invention makes it possible to shield from glare the eyes of all observers positioned outside an area above the device approximately defined by an imaginary wall extending vertically upwardly from the outer walls of the device; in practice this includes virtually all persons viewing the illuminated object, even if such a group of observers completely encircles such object, as most will be positioned outside said area.

Other applications, embodiments and configurations of the present invention may be devised by persons skilled in the art without deviating from the principal features described herein and these are intended to be included within the scope of the appended claims.

What is claimed is:

1. A plant illuminating apparatus for electrically lighting plants exposed to rain, comprising:

a watertight housing having water-impermeable walls including an upper wall having horizontal portions, adapted to have plants to be illuminated positioned directly above and proximate to said housing, said horizontal portions of said upper wall horizontally extending under the outer reaches of said plants and having transparent portions near its periphery, and a side wall extending downwardly from the periphery of said upper wall, planter means disposed centrally with respect to said transparent portions of said upper wall having an upper opening adapted to contain at least one plant, an artificial light source disposed in said housing in close proximity to said plant, light reflective means on at least one inside surface of said housing, and watertight means for conducting electrical power to said light source wherein light from said light source escapes upwardly from said housing through said transparent portions in said upper wall and is directed towards the outer reaches of the plant to be illuminated in an enveloping manner, and whereby water falling on said housing is conducted along the outer surfaces of said water-impermeable walls to a level below that of said light source.

2. The plant illuminating apparatus as claimed in claim 1, further comprising a light impervious outer receptacle having peripheral walls protruding upward and having drainage means therein whereby the upper portions of said receptacle prevent the light from said light source from being directly visible to observers grouped around said plant.

3. The plant illuminating apparatus as claimed in claim 1, wherein said housing has openings for air circulation, said openings being provided below said light source.

4. The plant illuminating apparatus as claimed in claim 1, wherein said housing and planter means are part of a one-piece housing.

5. The plant illuminating apparatus as claimed in claim 2, wherein said watertight housing and outer receptacle are loosely joined, overlapping, detachable members relying solely on the principle of gravity to prevent water from contacting said light source.

* * * * *